Jan. 17, 1956    O. N. FOUST    2,730,819
COMPOSITE INSOLES, INCLUDING MICRO-POROUS POLYMERIC MATERIAL
Filed Nov. 17, 1949
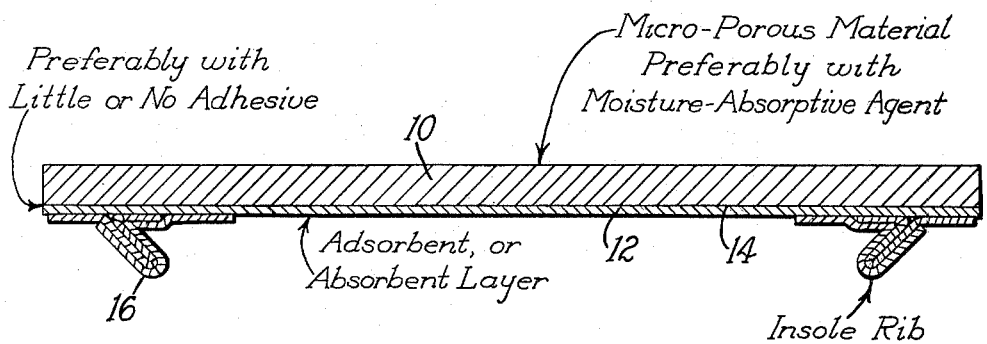
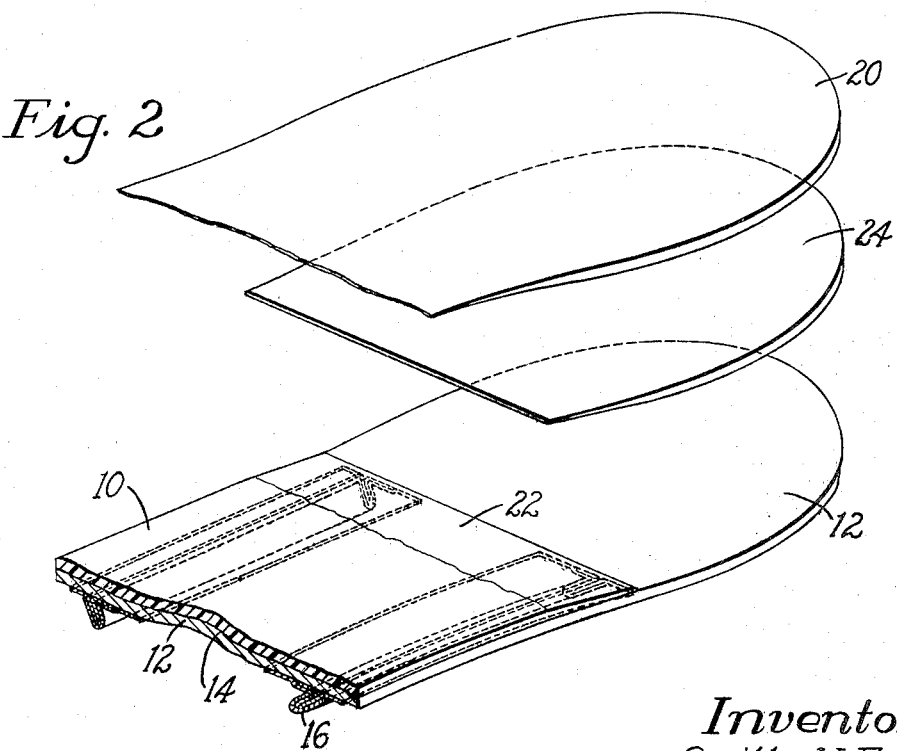
Inventor
Orville N. Foust
By his Attorney

United States Patent Office 2,730,819
Patented Jan. 17, 1956

2,730,819

COMPOSITE INSOLES, INCLUDING MICRO-POROUS POLYMERIC MATERIAL

Orville N. Foust, Melrose, Mass., assignor to United Shoe Machinery Corporation, Flemington, N. J., a corporation of New Jersey Application November 17, 1949, Serial No. 127,983

3 Claims. (Cl. 36—22)

This invention relates to shoe parts or insoles for footwear and more particularly to composite insoles for shoes.

Leather, paper products, and other materials have been used in the making of insoles but such material have various disadvantages and this is so particularly in the case of leather. Insoles made of such materials frequently have gutters formed therein during wear (particularly when the insole is not adequately supported due to improper bottom filling), and are subject to deterioration, because of the action of moisture or of perspiration, with a resultant cracking and discoloration. Such insoles frequently, when worn for a short time, exhibit evidences of the growth of microorganisms which give rise to unpleasant odors. The growth of mold and the putrifactive decomposition has been overcome, to some extent at least, by the use of fungicides but unfortunately such use in many cases has resulted in irritation to the skin of the wearer and sometimes in an undesirable effect on the human system. Also, dermatitis often occurs because it is impossible, due to customary shoe materials and construction, to maintain conventional insoles in as sanitary a condition as would be desirable.

Synthetic, resinous, polymeric materials have been made which, when properly sintered in particle form into sheets, may be used as resilient insole materials and they have been so used with considerable success. A material of this nature has been developed for general use but not specifically for insoles and this material is disclosed in United States Letters Patent No. 2,371,868, granted to Berg and Doriat on March 20, 1945. The use and adaptation of synthetic resinous polymeric materials specifically for insoles is disclosed in the application for United States Letters Patent Serial No. 792,796, filed December 19, 1947, in the names of Foust and Ginty, this application being now abandoned. The insoles disclosed in the patent application referred to are and have been satisfactory and advantageous in the majority of the many trials to which they have been subjected. However, it has been found that the insoles referred to are sometimes uncomfortable to wear, particularly in hot weather and in so far as a few individual wearers are concerned. The reasons for the discomfort in these particular instances are not fully known or understood but they probably arise from the physiological differences present in the individuals concerned. Many of the satisfied wearers, despite the criticism of the plastic insoles by the few, greatly prefer the new insoles, as disclosed in the application Serial No. 792,796, in comparing them with other insoles they have used in times past.

Applicant has now found that an improved shoe part or insole of composite construction which will avoid the difficulties above referred to, can be made using synthetic, resinous, polymeric material for the basic composition. As herein illustrated, the composite insole comprises a layer of the polymeric material the composition of which includes a wetting agent, a thin and tough moisture absorptive or adsorptive material which is preferably fibrous and is adapted to serve as a permanent shoe constructive portion of the insole, and preferably an attaching portion such as a sewing rib joined to the thin material. A tuck of some harder material may, and preferably does, form a part of the insole at the heel seat.

It is an object of this invention to provide an improved insole which is of composite construction comprising a microporous plastic material which insole exhibits advantageous characteristics not heretofore obtainable and which will enhance foot comfort.

With the above object in view, the invention will now be described in detail in connection with the accompanying drawing and will thereafter be pointed out in the claims.

In the drawings,

Fig. 1 shows an enlarged cross section taken across the forepart of an insole embodying the features of the invention; and Fig. 2 is an exploded view, in perspective, of the heel seat portions of the insole.

That part 10 of the insole, which is to come most intimately in contact with the foot and is shaped to conform to the edge contour of the bottom of a last, is made of sintered, micro-porous polymeric material and the thickness thereof is preferably five iron but has been found suitable if of a thickness ranging from four to seven iron. It is necessary that the thickness come within this range or is at least four iron for foot comfort and proper insole bulk or body to give the desired resiliency. As stated above, a wetting agent is included in the composition of this layer for it has been found that such an agent increases foot comfort in all cases and serves to avoid the discomfort previously experienced by those few individuals in wearing the insoles disclosed in the patent application Serial No. 792,796, above referred to.

In the specification and claims the term "wetting agent" (or "polar compound") is employed to comprehend those generally organic substances which possess a gradation of properties within the molecule, different sections of which have appreciably different properties, such as solubility, or affinity for other substances and particularly a capacity to wet water repellent materials. These terms "wetting agent" or "polar compounds" include those substances which show relatively low interfacial tension toward both water resistant materials on one hand and water on the other. In other words, these terms include those substances each molecule of which is composed essentially of two parts, viz, a hydrocarbon, which has a strong attraction for and is miscible with oils, greases, and waxes, and which also is relatively non-polar, and an active group or groups of atoms which has a strong affinity or attraction for water.

A moisture absorbing or adsorbing material 12 is provided in a layer which is thinner (the layer should have a thickness of from one to four iron) than the sintered plastic layer. The preferred thickness is two or three iron. This thinner layer may be of leather, fabric or a material such as Texon, the latter being a fibrous material impregnated with a rubber solution and made by Texon, Incorporated, of Huntington, Mass. The sintered plastic, while perhaps not storing moisture as well as leather, transmits it better than does leather. The micro-porous material absorbs little moisture if backed by a moisture-impermeable material but, on the other hand, if it is backed by a moisture permeable or moisture storing material it will readily transmit moisture from the foot to the backing material for ultimate dissipation. The effect is to increase foot comfort to a surprising extent. Preferably, little or no adhesive is used at 14 to bond the two layers 10 and 12 together. Spot bonding with a suitable adhesive may be advantageous, particularly around the margin of the insole, whereby the composite insole may be handled as a unit prior to and during incorporation in a shoe structure. Such spot bonding would not necessarily be so great in extent as to prevent subsequent removal of the porous plastic layer 10 from the shoe for washing or cleansing. If too much adhesive were used between the two layers 10 and 12 of the composite insole, moisture transmission from the foot would be curtailed appreciably and such a condition would be undesirable.

If a Goodyear welt type of shoe is to be made, a sewing rib 16 may be adhesively or otherwise attached to the thin layer 12 of the composite insole. Such a rib is shown in the drawings and may be of the type disclosed in the United States Letters Patent No. 2,458,500, granted January 11, 1949, to Bertrand and Clark. The rib 16 adds body and requisite stiffness to the thin layer 12 of the moisture absorptive material.

The composite insole may have layers 10 and 12 coextending throughout the length of the insole—i. e.,—including the heel seat but Fig. 2 shows an alternative form of construction for the heel seat in which the portion or pad 20 has been cut away at 22 from the main portion of the porous plastic layer 10. With such a construction, a hard fiber tuck 24 is attached to the thin layer 12 by an adhesive, stitching or other means. The plastic portion or pad 20 is separated or removed from the composite insole during the shoe manufacturing procedure and with the tuck 24 directly in contact with the steel plate on the last the tacks or other devices for attaching the heel or outsole may be driven through the layer 12 and upset on the steel plate to clinch over the tuck 24. Such a construction is preferred as the material of the plastic layer 10 or pad 20 is somewhat soft for the purpose of holding tacks, nails or staples. After the last has been pulled or removed from the shoe the pad 20 may be refastened to the composite insole and over the tuck 24 by an adhesive or other means.

The term "micro-porous" is used herein to define a material having pores which are so small that they are not easily discernible by the naked eye but which permit passage of air therethrough.

Some examples of the methods for producing the suitable micro-porous polymeric material are given below:

*Example 1*

Seventy-five parts by weight of Hycar OR-25 latex are added to three hundred parts by weight of water and to this are added two hundred parts by weight of Saran F120 resin (1000 cps.) powder with stirring. The stirring is continued with the addition of a solution causing precipitation of the latex. This solution consists of six hundred parts by weight of an aqueous calcium chloride solution (1% or 2% concentration). After the precipitation and intimate mixing has occurred the water is decanted and the mixture of resins is centrifuged and dried at about 50° C. Subsequent to the removal of the water the somewhat loose resin particle mixture is crumbled and sifted through a 30 mesh screen.

The resultant, sifted and intimate mixture of heterogeneous resins is then placed as a layer within a closed mold, the depth of the powder being about .220 of an inch and pressure is applied to reduce the thickness of the layer to about .104 of an inch. As a press is used, the platens may then be heated to raise the temperature of the layer to about 118° C. About three minutes are used in thus heating the plastic material. After cooling, the layer of plastic particles is removed from the mold as an integral microporous sheet.

The Saran F120 resin powder is a copolymer of vinylidene chloride and acrylonitrile and is a product of the Dow Chemical Company of Midland, Michigan.

The Hycar OR-25 latex is a suspension of minute particles of butadiene acrylonitrile (33%) copolymer resin suspended in a water emulsion of a fatty acid soap. The solids content of the latex is about 40%. It is a product of the B. F. Goodrich Chemical Co. of Cleveland, Ohio.

*Example 2*

Ingredients: Parts by weight
VYNY _____ 125
Methox _____ 15
Hycar OR-15 (powder) _____ 93.75
Calcium stearate _____ 2.5
VIN _____ 3.75

The VYNY is a copolymer of vinyl chloride and vinyl acetate produced by the Carbide and Carbon Chemicals Corporation of New York, N. Y.

Methox is di-methoxy ethyl phthalate—a plasticizer made by the Ohio-Apex, Incorporated, of Nitro, West Virginia.

The VIN is a stabilizer product composed of strontium octoate made by Advance Solvents and Chemical Corporation of New York, N. Y.

These ingredients are milled hot ( about 135° C.) on a rubber mill and formed into a sheet.

The sheet is then chopped into small strips.

The strips are then chilled in Dry Ice for about five minutes after which they are chopped into pieces about 1/16 of an inch across.

The small pieces are then sent through a Wiley laboratory mill and ground or chopped into a very fine powder (approximately 40 mesh).

The fine powder is then placed in a mold as a layer with .25 inch depth and is thoroughly heated to a temperature of 174° C. at which temperature a light pressure is applied and the powder is pressed down thereby to a thickness of .110 inch.

The resultant sintered layer is cooled and removed from the mold as an integral micro-porous sheet of high porosity and relatively high strength.

*Example 3*

Ingredients: Parts by weight
Polyblend 500 x 479 _____ 125
Hycar OR-15 (powder) _____ 28.
Calcium stearate _____ 2
Cashew nutshell resin (Durez #12687) ____ 8.75
VIN _____ 4
Vanstay _____ 3
Dioctyl phthalate _____ 4.37
Sulphur _____ 2.25
Captax _____ 3
Agerite Stalite _____ 1.4

The Polyblend 500 x 479 is a blend of a polyvinyl chloride resin and butadiene acrylonitrile copolymer rubber.

The cashew nutshell resin is a thermosetting resin obtained by the condensation of a cashew nutshell oil and another phenol with an aldehyde and is described in United States Letters Patent No. 2,203,206, granted on June 4, 1940, to Shepard et al.

The Vanstay is a stabilizer produced by R. T. Vanderbilt Company of New York, N. Y.

The Captax is a rubber accelerator (mercaptobenzothiazole) produced by the R. T. Vanderbilt Company.

Agerite Stalite is heptylated diphenylamine, also a product of R. T. Vanderbilt Company.

When the procedure of Example 2 is followed using the same sintering temperature of 174° C. a brown sheet is formed which is very porous.

*Example 4*

Ingredients: Parts by weight
VYNY _____ 1500
Methox _____ 289
Tween #20 _____ 5
Coloring solution _____ 134
Santicizer #141 _____ 374

The Tween #20 is a wetting agent produced by the

Atlas Powder Company of Wilmington, Delaware. According to the Handbook of Material Trade Names by Zimmerman and Lavine, pages 449 and 450, published by Industrial Research Service, Dover, New Hampshire, it is a non-electrolyte, surface-active agent posssssing emulsifying, detergent, and wetting properties. It is stated to be a polyoxyalkylene derivative of sorbitan monolaurate and at 25° C. it takes the form of an oily liquid and is soluble in water.

The Santicizer #141 is a plasticizer composed of octyl diphenyl phosphate made by the Monsanto Chemical Company of St. Louis, Missouri.

The coloring solution is made up to give a light brown color to the plastic material. This solution contains the following:

| Ingredients: | Parts by weight |
| --- | --- |
| Methox | 370.5 |
| Titanox M. O. | 60 |
| Cadmium Red | 80 |
| Chromium Green | 39 |
| Chromium Orange | 20.5 |

A dough mixer is employed in mixing the ground coloring ingredients and the liquids with the copolymer.

When small particles of this material (including the coloring solution) are sintered to form a porous sheet and compressed slightly during the sintering to secure the proper porosity a composition is had which is exceptionally advantageous in so far as the securing of foot comfort is concerned.

A wetting agent such as Duponol O. S. may be used in place of Tween and other wetting agents may be substituted or incorporated in the mix to receive and transmit the moisture. Duponol O. S. is a fatty alcohol sulfate, liquid oil or wax soluble emulsifying agent.

With the unitary layer of micro-porous material loosely placed in a shoe or lightly bonded to the inside of a shoe that layer may be removed periodically and rendered sanitary by washing. The material may be stretched and compressed and will exhibit a sponge-like characteristic in the washing operation. The material dries readily and no undue delay is necessary before the plastic layer may be reinserted in the shoe.

Having thus described my invention, what I claim as new and desire to secure by Letters Patent of the United States is:

1. A shoe part shaped to conform to the edge contour of the bottom of a last, said shoe part comprising an integral foot-contacting insole layer of microporous, thermoplastic water-insoluble synthetic resinous polymeric plastic with a thickness of at least four iron, and said plastic containing a wetting agent effective substantially to increase its moisture absorptive and dissipitative capacity.

2. A laminated shoe insole having an outline shape to conform to the edge contour of the bottom of a last, said insole comprising a foot-contacting layer of microporous thermoplastic water-insoluble synthetic resinous polymeric plastic which is inherently resilient and will inherently yield readily to compression, a wetting agent in said layer to increase its capacity for receiving and transmitting moisture from the foot and a moisture absorptive fibrous backing layer permanently united in moisture receiving face-to-face contact with the under side of said foot-contacting layer, said backing layer being a tough material adapted to serve as a permanent shoe constructive portion of the insole.

3. A laminated shoe insole having an outline shape to conform to the edge contour of the bottom of a last, said insole comprising a foot-contacting layer of microporous thermoplastic water-insoluble synthetic resinous polymeric plastic which is inherently resilient and will inherently yield readily to compression, a wetting agent in said layer to increase its capacity for receiving and transmitting moisture from the foot, a moisture absorptive fibrous backing layer attached in moisture receiving face-to-face contact with the underside of said foot-contacting layer, said backing layer being a tough material adapted to serve as a permanent shoe consrtuctive portion of the insole, and a sewing rib attached to the margin of said fibrous backing for attaching permanently the insole to the upper of a shoe.

References Cited in the file of this patent

UNITED STATES PATENTS

| | | |
| --- | --- | --- |
| 909,338 | Sharwood | Jan. 12, 1909 |
| 1,263,187 | Abbott | Apr. 16, 1918 |
| 1,269,518 | Bain | June 11, 1918 |
| 1,312,758 | Spear | Aug. 12, 1919 |
| 1,857,100 | McCormick et al. | May 3, 1932 |
| 2,003,961 | Vittengl | June 4, 1935 |
| 2,018,710 | Elkin | Oct. 29, 1935 |
| 2,027,425 | Hall | Jan. 14, 1936 |
| 2,061,539 | MacDonald et al. | Nov. 17, 1936 |
| 2,135,473 | Russell | Nov. 1, 1938 |
| 2,288,448 | Griswold | June 30, 1942 |
| 2,297,248 | Rudolph | Sept. 29, 1942 |
| 2,349,613 | Chollar | May 23, 1944 |
| 2,353,877 | Chollar | July 18, 1944 |
| 2,371,868 | Berg et al. | Mar. 20, 1945 |
| 2,425,388 | Oestricher | Aug 12, 1947 |
| 2,440,705 | Supple | May 4, 1948 |
| 2,466,911 | Raymond | Apr 12, 1949 |
| 2,559,609 | Foust | July 10, 1951 |

FOREIGN PATENTS

| | | |
| --- | --- | --- |
| 477,167 | Great Britain | Dec. 23, 1937 |
| 488,255 | Great Britain | June 30, 1938 |